United States Patent [19]

da Rosa

[11] 4,107,277

[45] Aug. 15, 1978

[54] PROCESS FOR PRODUCTION OF AMMONIA

[76] Inventor: Aldo Vieira da Rosa, P. O. Box 443, Palo Alto, Calif. 94302

[21] Appl. No.: 704,772

[22] Filed: Jul. 13, 1976

[51] Int. Cl.² ............................................. C01C 1/04
[52] U.S. Cl. .................................... 423/359; 204/129; 423/362
[58] Field of Search .............................. 423/359–363; 204/129

[56] References Cited

U.S. PATENT DOCUMENTS

| | | | |
|---|---|---|---|
| 3,368,869 | 2/1968 | Gaumer | 423/359 |
| 3,397,959 | 8/1968 | Scholz | 423/359 |

FOREIGN PATENT DOCUMENTS

| | | | |
|---|---|---|---|
| 776,582 | 1/1968 | Canada | 423/359 |
| 2,201,025 | 7/1973 | Fed. Rep. of Germany | 423/359 |
| 1,125,583 | 8/1968 | United Kingdom | 423/360 |
| 364,563 | 11/1973 | U.S.S.R. | 423/359 |

OTHER PUBLICATIONS

Noyes "Ammonia and Synthesis Gas" (1964) pp. 65 & 66.

*Primary Examiner*—Edward J. Meros

[57] ABSTRACT

An improved process for the production of ammonia by the synthesis of hydrogen and nitrogen employs a high pressure electrolyzer to produce hydrogen at the high pressures required by the ammonia synthesis process without use of mechanical compressors, utilizes the byproduct high pressure oxygen for refrigeration purposes needed in the process and combines hydrogen and nitrogen in a high pressure reactor. Steam formed in the cooling of the reactor is used to generate electricity for use in the electrolyzer to produce the hydrogen and the oxygen.

3 Claims, 1 Drawing Figure

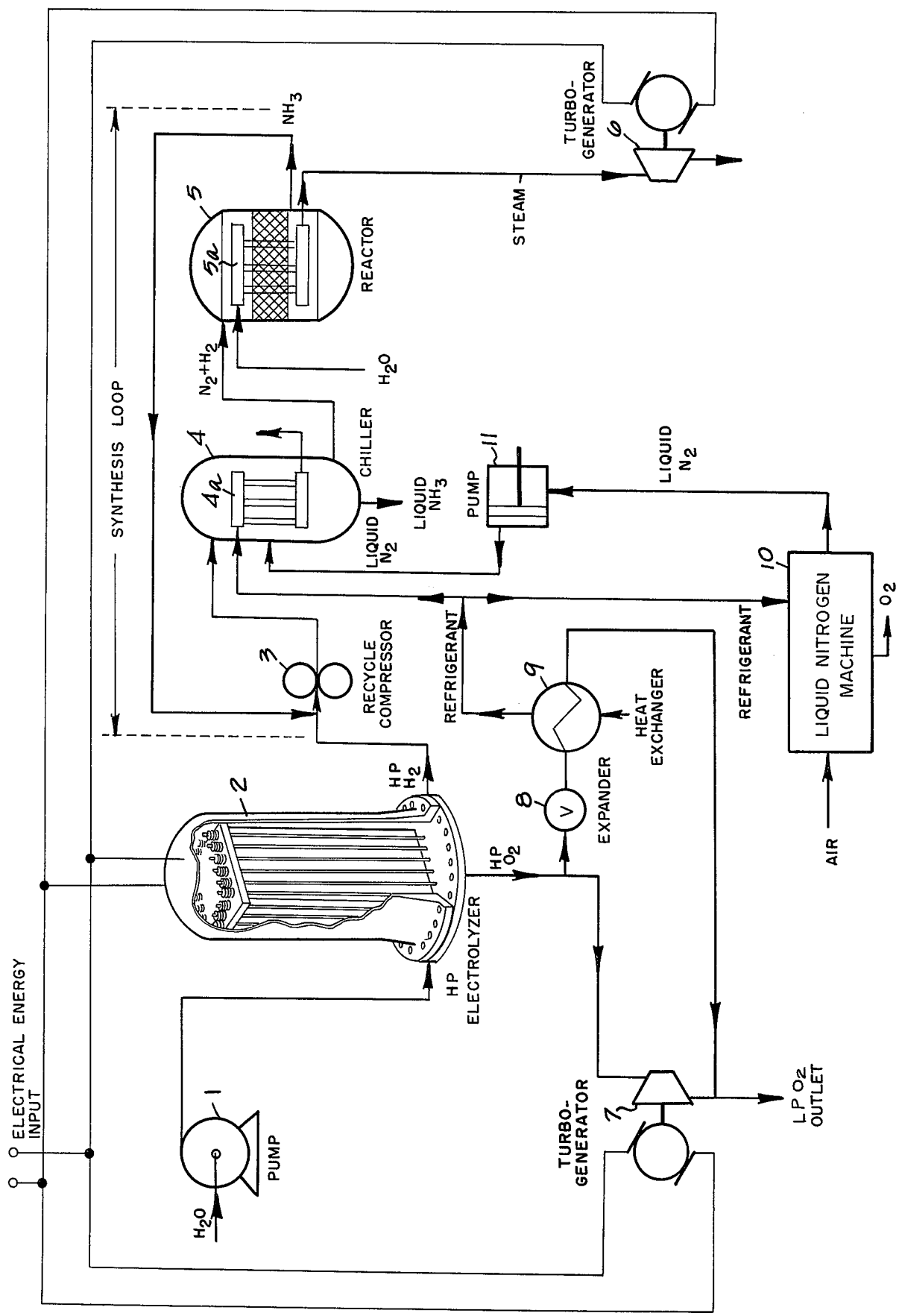

PROCESS FOR PRODUCTION OF AMMONIA

BACKGROUND OF THE INVENTION

The production of ammonia by the synthesis of hydrogen and nitrogen at high pressure is old in the art. Existing processes provide for mixing hydrogen and nitrogen gas, raising the mixture to a high pressure by means of a main compressor sometimes referred to as a "make-up compressor" or a "synthesis gas compressor" and introducing such a mixture into a high pressure reactor where, usually with the aid of a suitable catalyst, the synthesis is initiated. Provision is usually made for recycling the synthesized gas through a recycle compressor, thence to a refrigerated chiller where the ammonia is condensed to liquid form and discharged as a finished product. The chiller may be between reactor and the recycle compressor rather than before the recycle compressor and the reactor. The latter step entails the use of a suitable refrigeration compressor and refrigeration system.

The main compressor referred to above is a highly expensive and cumbersome piece of machinery requiring not only a high initial cost of installation, but requiring also high maintenance costs and high operating costs, all of which combine to increase considerably the cost of the finished product.

Other problems associated with existing plants and processes are concerned with the high cost of power required to operate the pumping and refrigerating equipment, as well as the attendant maintenance and operational expenses.

Many steps have been taken to improve over the basic process, and the prior art as currently known to applicant is summarized briefly below.

Haber, U.S. Pat. No. 1,202,995 is the basic patent which teaches the synthesis process of ammonia.

Crooks, U.S. Pat. No. 3,054,660 teaches the use of a compressor which utilizes the expanding uncombined fraction of ammonia for its driving purposes.

Bresler, U.S. Pat. No. 2,799,562 teaches a method of controlling a high pressure compressor in an ammonia synthesis plant from the pressure in a low pressure hydrogen holder supply.

Didycz, U.S. Pat. No. 3,396,982 discloses a method of cascading catalyst beds in a reactor to improve the yield of ammonia.

Alleman, U.S. Pat. No. 3,413,091 teaches a method of recovering prematurely synthesized ammonia in a typical plant.

Yeh, U.S. Pat. No. 3,344,052 discloses the use of electrostatically charged catalysts.

Slade, U.S. Pat. No. 1,664,997 and Kniskern, U.S. Pat. No. 1,721,455 disclose respectively a method of drying ammonia by use of refrigeration below zero degrees centigrade and use of an intermediate heat exchanger for greater efficiency.

Pyzel, U.S. Pat. No. 1,849,357 discloses a method of low pressure conversion made practicable by compression of partially converted mixture, condensing, separating and using expansion for cooling and returning the ammonia.

None of the prior art presently known to applicant solves the basic problems with this process in existing plants as described above.

SUMMARY OF THE INVENTION

I have discovered that by the use of my novel process I am able to eliminate the main compressor with its attendant problems and reduce the cost, not only of the initial plant but also the operating and maintenance costs. This I accomplish by introducing into my process the use of a high pressure electrolyzer which produces oxygen and hydrogen at the relatively high pressures at which ammonia synthesis takes place, making such high pressure hydrogen directly available to the ammonia synthesis steps.

I have discovered further that by thus producing high pressure oxygen I am able to use it for the purpose of refrigeration needed in other steps of the process by allowing said oxygen to expand either through a static device or else through a turbogenerator to produce some of the electrical power for my electrolyzer. I may utilize the refrigeration effect in combination with a liquid nitrogen machine which produces liquid nitrogen from air. The liquid nitrogen in turn may be introduced in the process to combine with high pressure hydrogen mentioned above and thence to the high pressure reactor for synthesis into ammonia, avoiding the need of a gaseous nitrogen compressor.

The cooling required for the exothermic process in the synthesis reactor I effect by introducing cooling water in suitable heat exchange equipment in the reactor where it is converted into steam. I may then utilize the steam to drive a turbo-generator generating part of the electricity needed to operate my high pressure electrolyzer which produces the high pressure oxygen and hydrogen as mentioned above.

I thus produce a regenerative system which effects substantial economies in energy to improve the overall efficiency of the basic process.

DESCRIPTION OF THE DRAWING

The FIGURE is a schematic flow diagram illustrating the process of my invention and showing the principal component parts.

DESCRIPTION OF A PREFERRED EMBODIMENT

Referring now to the FIGURE, there is seen first a pump 1 which may be of a conventional high pressure type. The pump 1 supplies liquid water at high pressure to the electrolyzer 2.

The electrolyzer, which effects the electrolysis of water into hydrogen and oxygen may be of a type known as the "Solid Polymer Electrolyte Cell" such as that manufactured by the General Electric Company. One embodiment of such an apparatus comprises the location of the electrolyzer cells inside a high pressure vessel. Dissociation of water into hydrogen and oxygen is effected in the usual manner except that both gases evolve from the electrolyzer at pressures which may be as high as needed for ammonia synthesis (150 to 1000 atmospheres).

Leaving the electrolyzer 2 at high pressure, the hydrogen passes through the recycle compressor 3 to the chiller 4. Nitrogen can be introduced in the system through one intake of the recycle compressor or it can be injected in liquid form directly into the chiller 4 as shown in the FIGURE. Cooling of the chiller is effected either by the evaporation of the liquid nitrogen or by a refrigerant supplied from another part of the system also described below. The chiller is equipped with a cooling means 4A as shown which is supplied with the said refrigerant.

From the chiller 4 the mixture of nitrogen and hydrogen then passes into the pressure reactor 5 which may be equipped with suitable catalyst beds known in the art.

The recycle compressor 3, the chiller 4 and the reactor 5, taken together are known as the synthesis loop.

Since the synthesis process is exothermic, a cooling water supply is provided to a cooling means located within the reactor where the high temperature converts the water into steam. The cooling means is shown schematically at 5A.

The ammonia formed, still in a vapor state, is returned to the recycle compressor 3 as shown and thence back to the chiller 4. Here, owing to the low temperature and high pressure, ammonia is condensed into a liquid and discharged as shown.

The steam formed in the cooling means 5A located inside the reactor 5 is used to drive the turbo-generator 6. The electrical energy produced is delivered back to the electrolyzer 2 and utilized to supply part of the power necessary for the electrolysis of water as described above.

Referring again more specifically to the electrolyzer 2, high pressure oxygen is produced as described above. This may be utilized in two ways. First it may be used to drive a turbo-generator 7, thus producing additional electrical energy required to operate the electrolyzer 2 as shown. The high pressure oxygen may be utilized also as a source of refrigeration. This may be accomplished by passing it through an expander 8 which causes the oxygen to cool and thence to a heat exchanger 9 where the cold oxygen cools a suitable refrigerant. The low temperature refrigerant thus produced may be used for the cooling means 4A located inside the chiller 4 and it may be used also as a source of refrigeration necessary for the production of the liquid nitrogen, as described below.

For the production of liquid nitrogen a suitable machine which may employ the Linde or similar process 10 may be used. In this, or similar processes, air is supplied as shown and through fractionating steps, liquid nitrogen is produced. The byproduct oxygen from machine 10, as well as the low pressure oxygen from the turbo-generator 7 or from the heat exchanger 9 which is likewise a byproduct, may then be processed in any suitable manner for further commercial use as desired.

Alternatively, if it becomes desirable to sell the oxygen in high pressure cylinders, the oxygen can be taken directly from the electrolyzer output into the said cylinders without need of a compressor.

An advantage of using a liquid nitrogen machine for the production of nitrogen to be used in the ammonia synthesis is that the nitrogen thus produced is essentially free from argon, a common contaminant. Argon free nitrogen avoids the need to periodically purge the synthesis loop, an operation that wastes time, hydrogen, nitrogen and ammonia.

The liquid nitrogen produced by the machine 10 may be pumped by means of pump 11 to the chiller 4 where it evaporates producing a cooling effect and mixes with the high pressure hydrogen coming from the electrolyzer described previously.

In a different configuration, the nitrogen may be produced in gaseous form and injected into the synthesis loop at any convenient point.

OPERATION

The successful operation of my plant and process may be understood by those skilled in the art from the following illustrative analysis.

A. Elimination of the Main Compressor

Operation of an electrolyzer inside a pressure vessel allows the production of oxygen and hydrogen at the high pressures used in ammonia synthesis, thus eliminating the need for a mechanical compressor.

The electrolysis of 1 mole of water results in the production of 1 mole of hydrogen and ½ mole of oxygen. Theoretically, the electric energy necessary to electrolyze water is the Gibbs free energy, G. If the overall efficiency of the electrolyzer is $\eta_E$, then the electric energy necessary to produce 1 mole of $H_2$ is $$E_E = G/\eta_E \text{ Joules/mole of } H_2$$

When an electrolyzer produces gases under high pressure, it will use more electric energy than when the gases are produced at low pressure. One reason for this is that the efficiency, $\eta_E$ becomes less as the pressure increases. Another reason is that there is energy stored in the high pressure gases. The electrolyzer acts as a high efficiency adiabatic compressor without moving parts.

The manner in which G varies with pressure, at constant temperature is $$G = G_o + R T_o \rho_n (P/P_o)$$

where R is the universal gas constant (8.31 $k$ J mole$^{-1}$) T is the temperature in kelvins and P is the pressure. The subscript, o, indicate reference conditions.

For liquid water at STP, $G_o$ is 237.5 $kJ$ mole$^{-1}$. If the product gases are allowed to build up a pressure of 300 atmospheres, $G = 237.5 + 14.2 = 251.7$ $kJ$ mole$^{-1}$, an increase of 6%. This amount of energy is small compared with the energy that would be needed if the compression were carried out by mechanical means.

B. Regeneration of Energy from the Exothermic Reaction of Nitrogen with Hydrogen If the hydrogen is burned to produce water it will release an amount of heat H per mole. It should be noted that H > G. For liquid water and gaseous $H_2$ and $O_2$ at STP H/G ≅ 1.2. Thus, an electrolyzer operating at high effiency may produce hydrogen whose heat content is larger than the electric energy used in the electrolysis. In other words, the electrolyzer acts as a heat pump.

When nitrogen and hydrogen are combined in the reactor, ammonia is produced according to $N_2 + 3H_2 \rightleftarrows 2NH_3$ The above reaction is exothermic, an amount of heat, $H_A$, being released per mole of ammonia formed. Some of this heat can be used to produce useful energy. In normal ammonia plants, the heat is used to drive a steam engine which, in turn, may drive a compressor. We propose to use the steam engine to drive an electric generator whose output is fed to the electrolyzer via appropriate power conditioning equipment. If $\eta_s$ is the overall efficiency with which the heat of the ammonia synthesis reaction is transformed into electricity, a fraction $$\eta_E \eta_s H_A / 1.5 \, G$$

of the input electric energy can be recovered. Maximum value of this fraction, when $\eta_E = 1$ and $\eta_s = 1$, is about 13%.

C. Regeneration of Energy Released by Decompressing the Oxygen Produced by Electrolysis The pressure electrolyzer produces high pressure oxygen in addition to high pressure hydrogen. The energy contained in the high pressure oxygen can be used to (a) remove heat from the ammonia chiller or from the liquid nitrogen machine, (b) drive a motor which in turn drives a generator whose output is fed back to the electrolyzer via an appropriate power conditioning system.

The amount of energy that can be extracted from the compressed oxygen depends on the manner in which the expansion takes place. If the process approaches isentropic conditions then $$P/P_1 = (T/T_1)^{\alpha/\alpha-1} = (H/H_1)^{\alpha/\alpha-1}$$

where $P$ is the pressure
$T$ is the temperature
$H$ is the enthalpy
$\alpha$ is the ratio of heat capacities at constant volume to that at constant press.

Taking $\alpha = 1.4$, we have $T/T_1 = (P/P_1)^{1/3.5}$
If $P = 200$ atmos and $P_1 = 1$ atmos then $T/T_1 = 4.5$
Thus, if the oxygen was originally at 360K, it would cool down to 80K.

The change in enthalpy, i.e., the maximum theoretical work done by the motor is $$\Delta H = \int_T^{T_1} C_p dT$$

where $C_P$ is the heat capacity of the oxygen. If $C_P$ were temperature independent and had a value equal to the theoretical value of 0.9 $Jk^{-1}g^{-1}$ then, for the $\Delta T$ of 280K of the example, $$\Delta H = 0.9 \times 280 = 252 J^{-1} g^{-1} \text{ or } \alpha kJ \text{ mole}^{-1}$$

Since each mole of water yields ½ mole of $O_2$ and consumes 237.5 kJ of electricity, it takes 475 kJ of electricity to produce one mole of oxygen. Thus the regenerated power is a small percentage of the input power. The merit of the oxygen expander lies in its cooling function, mainly.

D. Use of Liquid Nitrogen to Eliminate the Nitrogen Gas Compressor, to Aid in the Cooling of the Synthesized Gas, and to Eliminate Purging.

Nitrogen can be produced from air by liquefaction and subsequent fractional distillation. The remaining liquid $N_2$ can be injected into the synthesis loop in liquid form requiring only a simple liquid pump. If the point of injection is in the ammonia chiller then the evaporation of $N_2$ will aid in the refrigeration. (See the Figure at 4 and 11.)

In the usual type of ammonia plants, the synthesis gas, supposed to be a stoichiometric mixture of hydrogen and nitrogen, actually contains impurities, typically 1% methane and 0.3% argon. The latter, being chemically inert and not being condensable in the chiller, accumulates in the synthesis loop. This requires periodic purging of the loop with resulting losses of hydrogen, nitrogen, ammonia as well as of time. The hydrogen produced by electrolysis is chemically pure and the nitrogen produced from liquid air is free of argon because the builing point of the latter, at 1 atmosphere, is 87.6 K whereas the boiling point of nitrogen is 77.5 K. Thus, by using electrolytic hydrogen and nitrogen extracted from liquid air, there is no need of purging.

I claim:

1. A process for the production of ammonia comprising the steps:

subjecting water to electrolysis in a high pressure electrolyzer to produce hydrogen and oxygen at relatively high pressures;

introducing said high pressure hydrogen so produced into a synthesis loop comprising a recycle compressor, a chilling vessel, a reactor vessel, and interconnecting piping;

expanding said high pressure oxygen so produced in a first heat exchanger having a refrigerant circulating loop thereby effecting the cooling of said refrigerant;

circulating said refrigerant through said refrigerant circulating loop and through a second heat exchanger;

introducing nitrogen into said second heat exchanger thereby effecting liquefaction of said nitrogen;

introducing said liquid nitrogen into said chilling vessel thereby vaporizing said nitrogen and forming a mixture with said hydrogen from said synthesis loop and simultaneously cooling said mixture;

introducing said mixture of hydrogen and nitrogen into said reactor vessel thereby producing ammonia vapor;

circulating said ammonia vapor through said chilling vessel;

condensing said ammonia vapor in said chilling vessel;

removing said ammonia from said chilling vessel.

2. The process of claim 1 including the additional steps:

conducting a portion of said oxygen produced in said high pressure electrolyzer to a turbo-generator;

generating electrical energy in said turbo-generator;

conducting said electrical energy so generated to an electrical loop supplying said electrolyzer.

3. The process of claim 2 including the additional steps:

water cooling said ammonia vapor produced in said reactor vessel thereby producing steam;

conducting said steam to a turbo-generator;

generating electrical energy in said turbo-generator;

conducting said electrical energy to said electrical loop supplying said electrolyzer.

* * * * *